(12) United States Patent
Huang et al.

(10) Patent No.: US 10,196,801 B2
(45) Date of Patent: *Feb. 5, 2019

(54) WATER FLOW REGULATOR

(71) Applicants: XIAMEN SOLEX HIGH-TECH INDUSTRIES CO., LTD., Xiamen, Fujian (CN); Huasong Zhou, Fujian (CN)

(72) Inventors: Feilong Huang, Fujian (CN); Guosong Zhao, Fujian (CN); Wenxing Chen, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 27 days.

This patent is subject to a terminal disclaimer.

(21) Appl. No.: 15/274,732

(22) Filed: Sep. 23, 2016

(65) Prior Publication Data
US 2017/0138026 A1    May 18, 2017

(30) Foreign Application Priority Data
Nov. 13, 2015    (CN) .......................... 2015 1 0776786

(51) Int. Cl.
*E03C 1/084* (2006.01)
*E03C 1/08* (2006.01)

(52) U.S. Cl.
CPC ................ *E03C 1/084* (2013.01); *E03C 1/08* (2013.01); *E03C 2201/40* (2013.01); *Y02A 20/411* (2018.01)

(58) Field of Classification Search
CPC ...... E03C 1/08–1/086; E03C 2001/082; E03C 2201/40; B05B 1/3006; B05B 12/087; B05B 12/088; G05D 7/012; Y02A 20/411
(Continued)

(56) References Cited
U.S. PATENT DOCUMENTS 5,769,326 A  * 6/1998 Muchenberger .......... E03C 1/08
                                                                239/428.5
2012/0325933 A1* 12/2012 Blum ....................... E03C 1/08
                                                                239/428.5
(Continued)

FOREIGN PATENT DOCUMENTS
CN     1761791 A     4/2006
CN   202139650 U    2/2012
(Continued)

Primary Examiner — Alexander Valvis
Assistant Examiner — Cody Lieuwen
(74) Attorney, Agent, or Firm — Rabin & Berdo, P.C.

(57) ABSTRACT

A flow regulator includes a housing portion, a diversion device, an annular seat and an elastic water stop ring. The annular seat, the diversion device and the housing portion are fixedly assembled together. The diversion device includes a periphery wall disposed with diversion holes, a central base within the periphery wall and a deflecting annular wall fixedly connecting the periphery wall and the central base. The external periphery surface of the deflecting annular wall is gradually larger downwardly from the central base to the periphery wall. The central base at least partly extends out of the internal hole of the annular seat. A water flow clearance is formed between the central base and the hole wall of the internal hole of the annular seat. The water flow clearance is disposed above the deflecting annular wall so that water flows out of the flowing clearance and onto the deflecting annular wall.

10 Claims, 5 Drawing Sheets

(58) Field of Classification Search
USPC .......................................... 239/428.5, 533.1
See application file for complete search history.

(56) References Cited

U.S. PATENT DOCUMENTS

| | | | |
|---|---|---|---|
| 2013/0068860 A1* | 3/2013 | Tempel ................. | B05B 1/3033 239/428.5 |
| 2013/0082121 A1* | 4/2013 | Stein ..................... | E03C 1/08 239/428.5 |
| 2014/0145014 A1* | 5/2014 | Blum ..................... | E03C 1/084 239/428.5 |
| 2016/0002897 A1* | 1/2016 | Tempel .................. | E03C 1/084 239/428.5 |

FOREIGN PATENT DOCUMENTS

| | | |
|---|---|---|
| CN | 104047336 A | 9/2014 |
| CN | 102926437 B | 8/2015 |

\* cited by examiner

WATER FLOW REGULATOR

FIELD OF THE INVENTION

The present invention relates to a flow regulator.

BACKGROUND OF THE INVENTION

An integrated flow regulator is published in Chinese patent database with announce number CN102926437B, it comprises a main body, a mutation chamber, a fixed ring and a diversion device. Water from the outsider flows firstly through the filter, then through the diversion holes, and through the diversion passages finally to the mutation chamber, which sucks air in due to the negative pressure according to Venturi effect, water and air mix and flow out of the outlet; the elastic water stop piece directly faces to the water from the filtering portion, under the action of the water pressure, it expands at the diversion holes to change the effective section area of the diversion holes. In this application, firstly, water flows out of the diversion holes and directly vertically impacts the bottom plate, then flows out of the diversion passages, as water from the diversion holes directly vertically impacts the bottom plate, it greatly decreases the water pressure, resulting in reducing of outlet volume, and it also produces noise; secondly, the elastic water stop element is sleeved on the protrusion, when water pressure acts on the elastic water stop element, as the inner side of the elastic water stop element is limited that the elastic water stop element is pressed and deformed outwardly in the radial direction, resulting in bad water saving effect and bad volume stability. at the same way, CN202139650U, CN1761791A, CN104047336A has the same problem as CN102926437B.

SUMMARY OF THE INVENTION

The present invention is provided with a flow regulator, which overcomes the disadvantages of the existing known technology.

The technical proposal of the present invention is that:

A flow regulator, comprising a housing portion (100) and a diversion device (200) disposed in the housing portion (100), the diversion device (200) is used to divide the water flowing, the divided water flowing and the air sucked in are mixed to generate bubble water, wherein an annular seat (300) and an elastic water stop ring (400) are further provided, the annular seat (300), the diversion device (200) and the housing portion (100) are fixedly connected together;

the diversion device (200) comprises a periphery wall (210), a central base (220) in the periphery wall (210) and a deflecting annular wall (230) fixedly connecting the periphery wall (210) and the central base (220), the periphery wall (210) is disposed with diversion holes (211), the external periphery surface of the deflecting annular wall (230) is gradually larger downwardly radically from the central base (220) to the periphery wall (210), the central base (220) has at least a part extending out of the internal hole of the annular seat (300), a flowing clearance is formed between the central base (220) and the hole wall of the internal hole of the annular seat (300), the flowing clearance is disposed above the deflecting annular wall (230) to make water directly flow to the deflecting annular wall (230) through the flowing clearance;

the water stop ring (400) is supported on the annular seat (300) to surround and fit to the central base (220), so that the flowing area of the flowing clearance is adjustable by the water pressure so as to save water.

In another preferred embodiment, the annular seat (300) is fixedly connected to the periphery wall (210); a protruding wall (310) is protruded on the annular seat (300) to surround the internal hole of the annular seat (300), the external side of the water stop ring is contacted with the internal side of the protruding wall (310).

In another preferred embodiment, a filter (500) is further provided, the filter (500) is assembled to the protruding wall (310).

In another preferred embodiment, the upper periphery of the periphery wall (210) protrudes outwardly with a support plate (212), the external periphery of the support plate (212) protrudes upwardly to form a connecting wall (213), the annular seat (300) is supported on the support plate (212), the annular seat (300) is fixedly connected the diversion device (200) by the cooperation of the connecting wall (213) and the annular seat (300).

In another preferred embodiment, the central base (220) is arranged annularly with a plurality of protrusions (221) with spaces therebetween corresponding to the water stop ring.

In another preferred embodiment, the housing portion (100) is disposed with a mutation chamber (110) and a suction passage (120) connecting the inner and the outer of the mutation chamber (110), the diversion device (200) is located to the mutation chamber (110), the divided water enters the mutation chamber (110) and negative pressure generates.

In another preferred embodiment, the housing portion (100) comprises a housing (130) and a fixed ring (140), the housing (130) comprises an external wall (131), the external wall (131) is disposed with a suction passage (120) running through the inner and the outer, the fixed ring (140) is fixedly connected to the upper portion of the external wall (131), the diversion device (200) is fixedly connected to the fixed ring (140).

In another preferred embodiment, the fixed ring (140) is disposed with a conical surface (141) corresponding to the diversion holes (211), the conical surface (141) surrounds the diversion device (200), so that water flows out of the diversion holes (211) and impacts the conical surface.

In another preferred embodiment, the external revolution surface of the deflecting annular wall (230) comprises a part of the conical surface.

In another preferred embodiment, the external revolution surface of the deflecting annular wall (230) comprises a smooth curve.

In another preferred embodiment, the external revolution surface of the deflecting annular wall (230) comprises an arc with the center of circle outward.

Compared to the existing known technology, the technical proposal of the present invention has advantages as follows:

1. the deflecting annular wall is configured, the flowing clearance is disposed above the deflecting annular wall so that water flows out of the flowing clearance and then directly impacts the deflecting annular wall, it can reduce the pressure loss when water flows from the flowing clearance to the diversion holes, even in low pressure, it can achieve high volume and reduce impacting noise. The water stop ring is supported on the annular seat and surrounding and fitting to the central base, when water pressure acts on the elastic water stop element, the elastic water stop element deforms inwardly radically, it has well water saving effect and high stable flow volume.

2. the diversion device and the annular seat can be two separated components, the structure has advantages that when to develop products with different volume, it can just develop different diversion devices, and it can adjust the arrangement and size of the diversion holes as the different volume classes needed, so that it can achieve better outlet effect of the water type of the outlet devices.

BRIEF DESCRIPTION OF THE DRAWINGS

The present invention will be further described with the drawings and the embodiments.

DETAILED DESCRIPTION OF THE EMBODIMENTS

Figure 1:
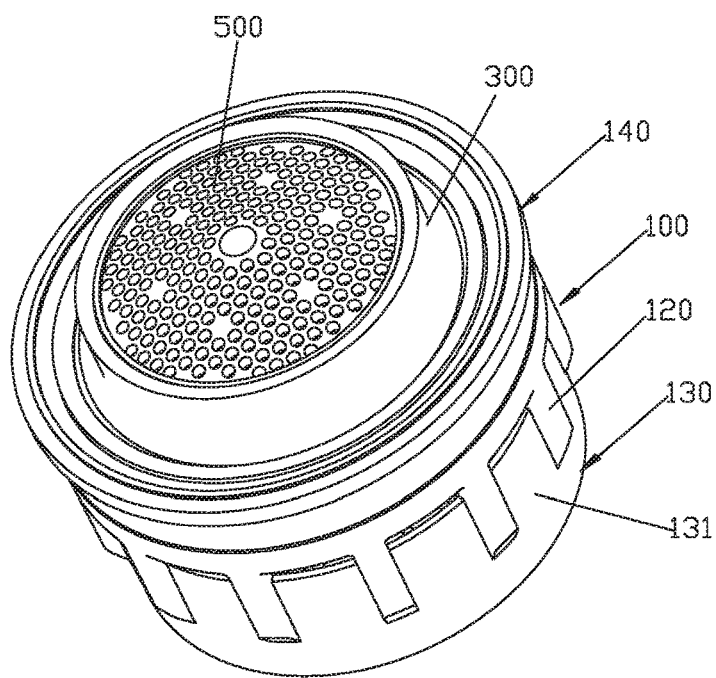
FIG. 1 illustrates a schematic diagram of an aerator of a preferred embodiment.
Figure 2:
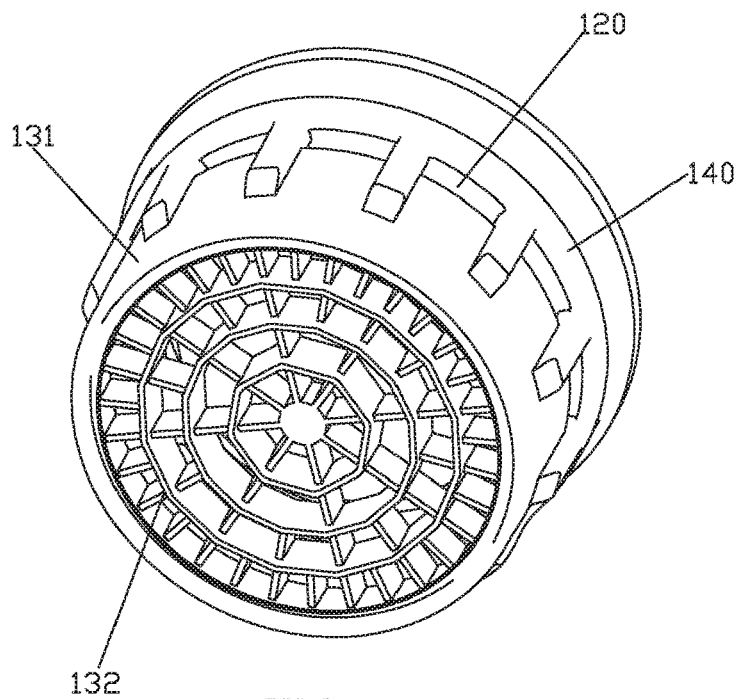
FIG. 2 illustrates a second schematic diagram of the aerator of the preferred embodiment.
Figure 3:
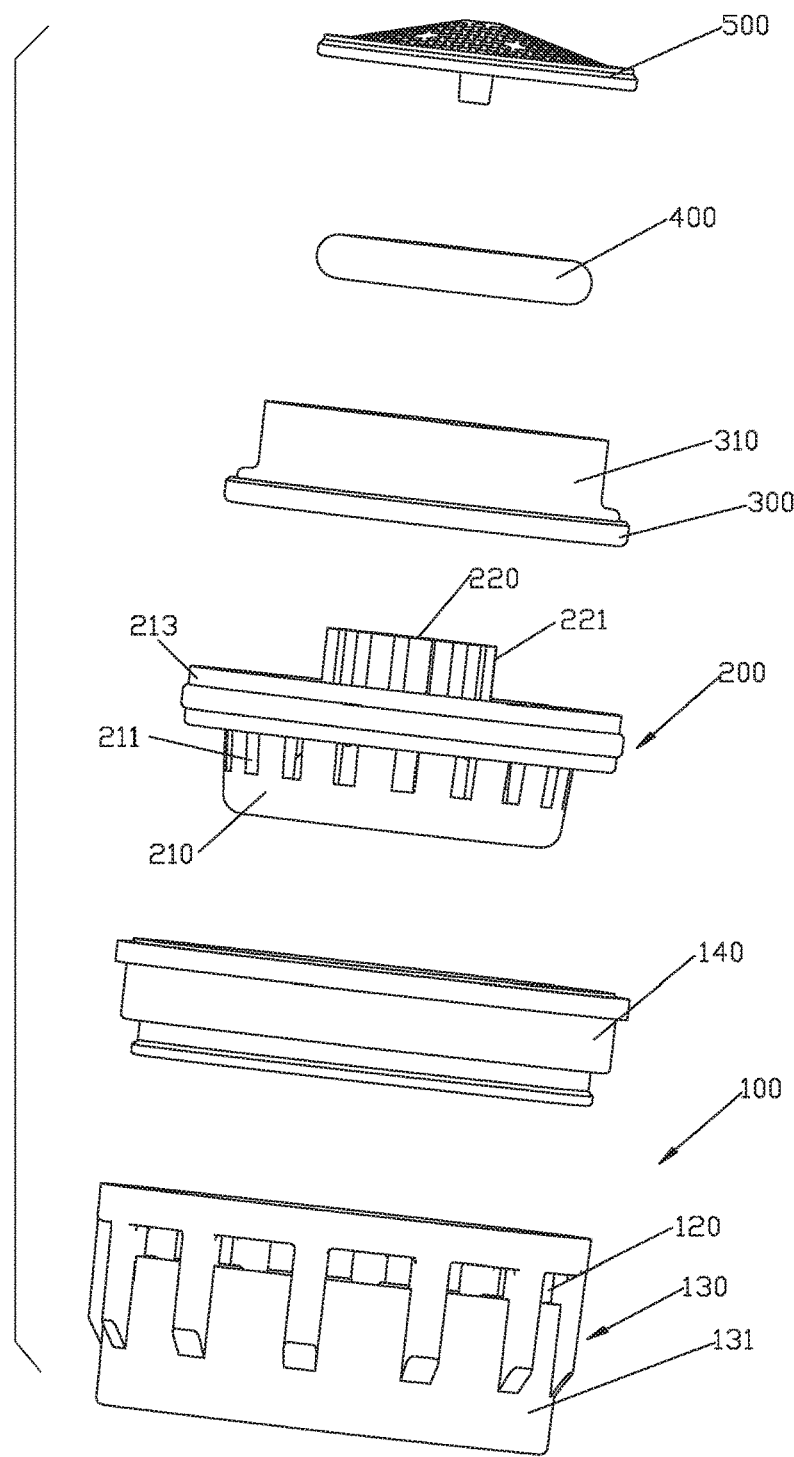
FIG. 3 illustrates an exploded and schematic diagram of the aerator of the preferred embodiment.
Figure 4:
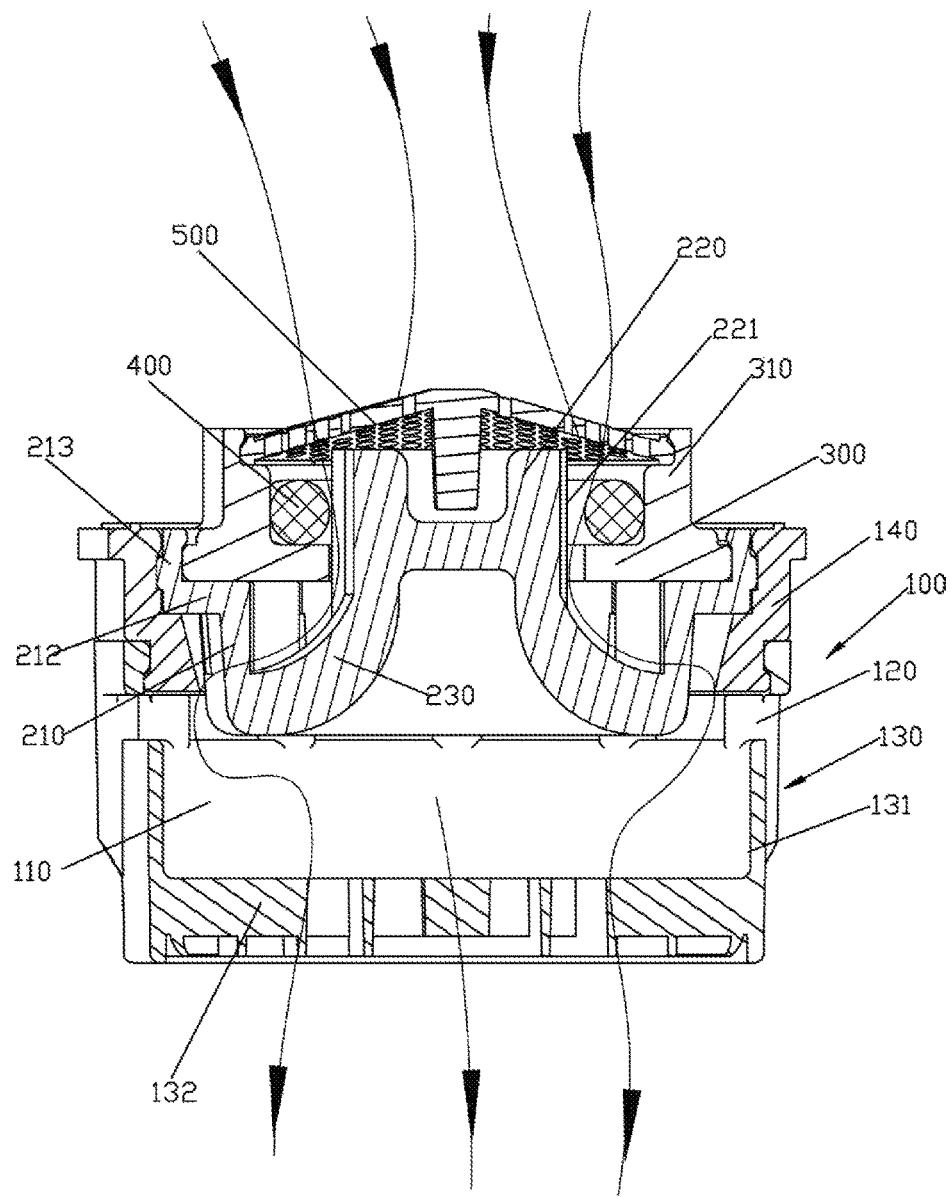
FIG. 4 illustrates a sectional diagram of the aerator of the preferred embodiment in low pressure state.
Figure 5:
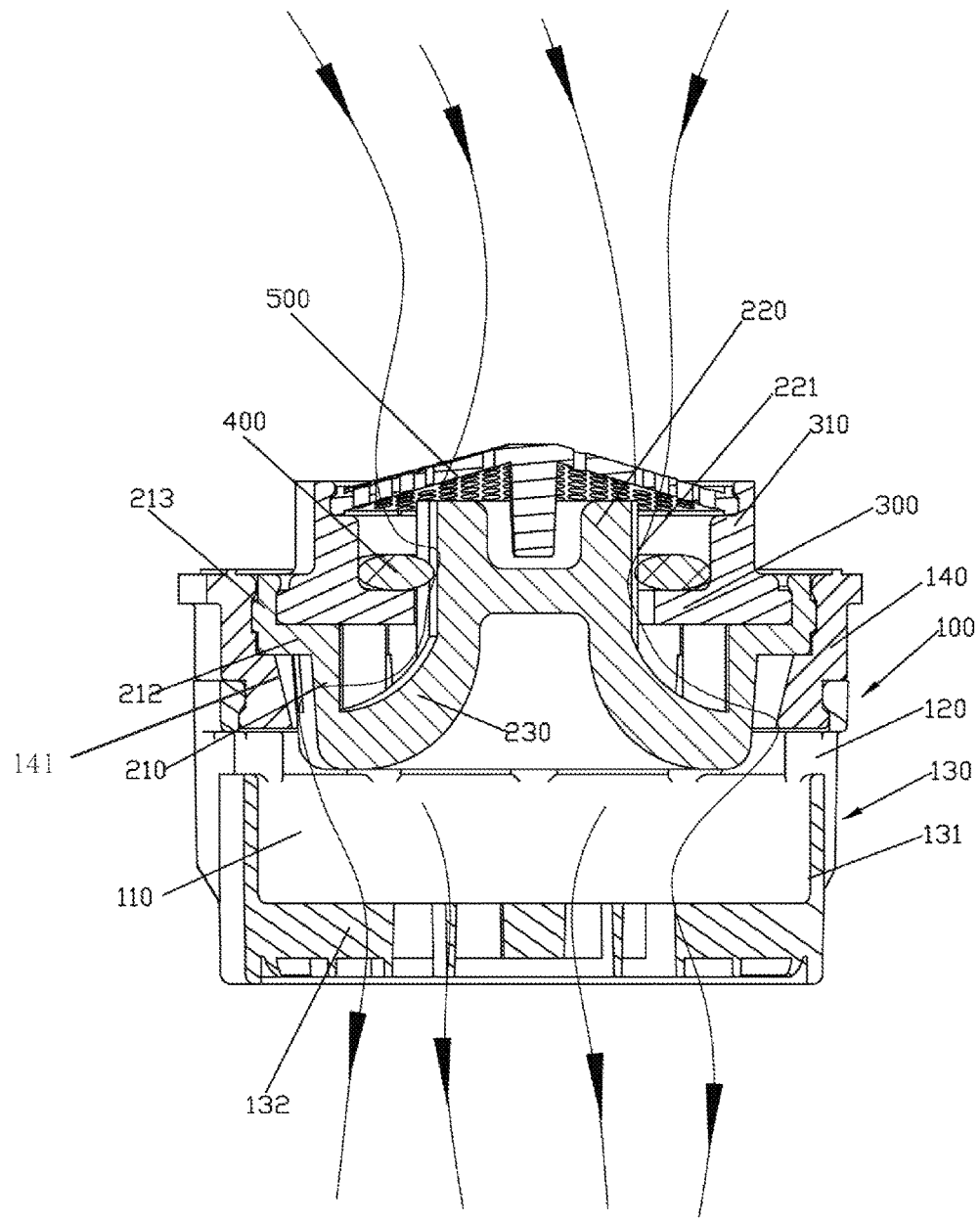
FIG. 5 illustrates a sectional diagram of the aerator of the preferred embodiment in high pressure state.
Figure 6:
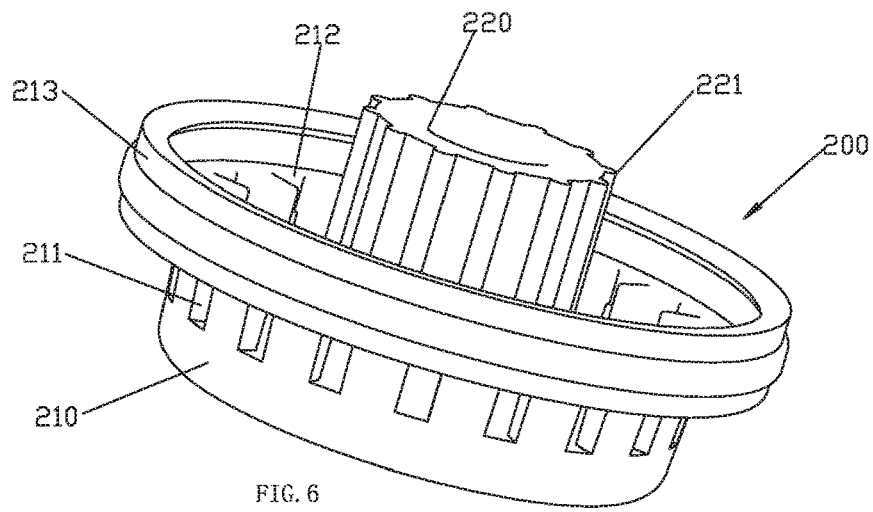
FIG. 6 illustrates a schematic diagram of a diversion device of the aerator.
Figure 7:
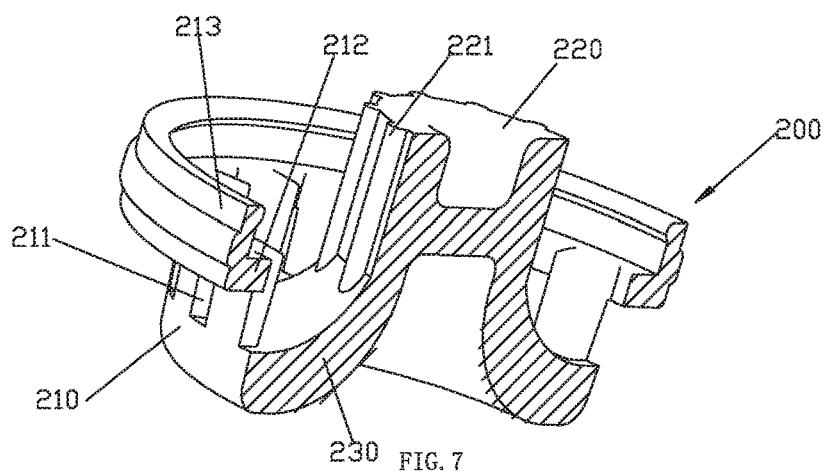
FIG. 7 illustrates a sectional schematic diagram of the diversion device of the aerator.
Figure 8:
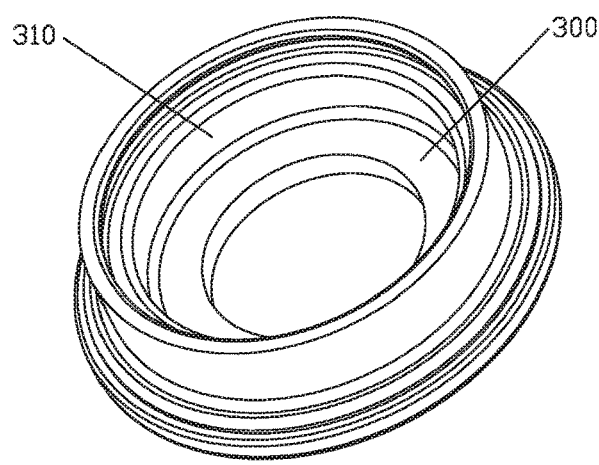
FIG. 8 illustrates a schematic diagram of an annular seat of the aerator.

Referring to FIGS. 1-8, the flow regulator comprises a housing portion 100, a diversion device 200 assembled in the housing portion 100, an annular seat 300, an elastic water stop ring 400 and a filter 500.

The housing portion 100 comprises a housing 130 and a fixing ring 140, the housing 130 comprises an outer wall 131 and an inserting element 132 fixedly connected at the bottom portion of the outer wall 131, the inserting element 132 is a grid outlet mesh, the outer wall 131 is disposed with a plurality of suction passages 120 annularly arranged running through the inside and outside of the outer wall 131, the fixing ring 140 is fixedly connected to the upper portion of the outer wall 131, the housing portion 100 is disposed with a mutation chamber 110.

The diversion device 200 comprises a periphery wall 210, a central base 220 in the periphery wall 210 and a deflecting annular wall 230 fixedly connecting the periphery wall 210 and the central base 220, the upper periphery of the periphery wall 210 protrudes outwardly with a support plate 212, the external periphery of the support plate 212 protrudes upwardly with a connecting wall 213, the periphery wall 210 is disposed with diversion holes 211, the diversion holes 211 divides the water flowing. The connecting wall 213 is fixedly connected to the fixing ring 140 so as to fixedly assemble the annular seat 300, the diversion device 200 and the housing portion 100 together.

Water flows out of the diversion device 200 to be divided and then enters the mutation chamber 110, when the diversion flowing enters the mutation chamber, the flowing area changes large, so that negative pressure generates, air is sucked through the suction passage 120 to mix with the water flowing to generate bubble water. Preferred, the fixed ring 140 is disposed with a conical surface 141 corresponding to the diversion holes 211, the conical surface 141 surrounds the diversion device 200, so that water flows out of the diversion holes 211 and impacts the conical surface then flows downstream, the mutation chamber 110 comprises the clearance of the conical surface and the periphery wall and the portion of the housing portion below the diversion device. As needed, the periphery wall can be configured with a surrounding wall and an annular bottom wall extending inwardly radially from the bottom edge of the surrounding wall, the diversion holes can be disposed at the surrounding wall or the annular bottom wall, in this embodiment, there is no annular bottom wall in the drawings, the diversion holes are disposed at the surrounding wall, as needed, they can also be disposed at the annular bottom wall.

The external periphery surface of the deflecting annular wall 230 is gradually larger downwardly radically from the central base 220 to the periphery wall 210, the central base 220 has at least a part extending out of the internal hole of the annular seat 300, a flowing clearance is formed between the central base 220 and the hole wall of the internal hole of the annular seat, the flowing clearance is disposed above the deflecting annular wall 230 to make water directly flow to the deflecting annular wall 230 through the flowing clearance. The external revolution surface of the deflecting annular wall 230 comprises a part of the conical surface. In other case, the external revolution surface of the deflecting annular wall 230 comprises a smooth curve or an arc with the center of circle outward.

The annular seat 300 is fixedly assembled to the periphery wall 210, the structure of the assembly is that: the annular seat 300 is supported on the support plate 212, the annular seat 300 is fixedly connected the diversion device 200 by the cooperation of the connecting wall 213 and the annular seat 300. A protruding wall 310 is protruded on the annular seat 300 to surround the internal hole of the annular seat 300, the water stop ring 400 is supported on the annular seat 300, the external side of the water stop ring 400 is contacted with the internal side of the protruding wall 310, the water stop ring 400 is supported on the annular seat 300 to surround and fit to the central base 220, so that the flowing area of the flowing clearance is adjustable by the water pressure so as to save water. Preferred, the central base 220 is arranged annularly with a plurality of protrusions 221 with spaces therebetween corresponding to the water stop ring. When in low pressure state, the elastic water stop ring suffers low action force, it deforms less, at this time, the flowing area of the water stop ring and the protrusions 221 of the central base 220 of the diversion device is larger, the flow volume can be controlled in a certain value, when in high pressure state, the elastic water stop suffers more and deforms greatly, at this time, the water stop ring and the protrusions of the central base 220 of the diversion device are fitting to each other to make the flowing area decrease when the pressure increases, the flow volume can be controlled in a certain value; so that the aerator has volume adjusting function, it can keep the volume constant in a certain pressure range.

The filter 500 is assembled to the protruding wall 310.

In this embodiment, the diversion device and the annular seat are separately manufactured, then fixedly assembled together, they can also be integrated manufactured, if they are separately manufactured, when to develop aerators with different volumes, it can just change the diversion device. The structure has advantages: it can configure diversion holes with different size according to different volume to achieve best draining effect. Water impacts the conical surface of the fixing ring after flowing out of the diversion holes of the diversion device, water is rectified and then flows out of the outlet mesh of the housing, it has advantages of stable outlet volume, water saving and softer water type.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A water flow regulator that generates bubble water, comprising:
    a housing portion having defined therein a mutation chamber and being provided with a suction passage that connects interior and exterior portions of the mutation chamber;
    a diversion device that is disposed in and fixedly connected to the housing portion, that is located on and in communication with the mutation chamber, and that comprises:
        a central base;
        a deflecting annular wall integral with and extending from the central base to contact the mutation chamber; and
        a peripheral wall integral with and extending from the deflecting annular wall back toward the central base and being provided with diversion holes,
        wherein the deflecting annular wall has internal and external peripheral surfaces that extend radially from the central base and flare to become gradually larger to contact the mutation chamber and to connect with the peripheral wall;
    an annular seat that has defined therein an internal hole with a hole wall and with at least a part of the central base accommodated by and extending outwardly from the internal hole, and that is fixedly connected to the diversion device and to the housing portion; and
    an elastic water stop ring that is supported on the annular seat proximate the central base of the diversion device,
    wherein the diversion device divides water flow which enters the mutation chamber and generates a negative pressure and is mixed with sucked-in air from the suction passage to generate said bubble water,
    wherein a water flow clearance is formed between the central base and the hole wall of the internal hole of the annular seat and has a water flow area, the water flow clearance is disposed before the deflecting annular wall to make water directly flow to the deflecting annular wall through the water flow clearance, and
    wherein the water stop ring that is supported on the annular seat surrounds and fits to the central base so that the water flow area of the water flow clearance is adjustable by water pressure so as to save water.

2. The flow regulator according to claim 1, wherein the annular seat is fixedly connected to the peripheral wall, a protruding wall having an internal side extends from the annular seat to surround the internal hole of the annular seat, and the water stop ring has an external side that contacts the internal side of the protruding wall.

3. The flow regulator according to claim 2, further comprising a filter that is provided and assembled on the protruding wall.

4. The flow regulator according to claim 2, wherein the peripheral wall has a peripheral portion that extends into a support plate that has an external periphery that extends to form a connecting wall, the annular seat is supported on the support plate, and the annular seat is fixedly connected to the diversion device by the cooperation of the connecting wall and the annular seat.

5. The flow regulator according to claim 1, wherein the central base is annularly provided with a plurality of protrusions with spaces therebetween corresponding to the water stop ring.

6. The flow regulator according to claim 1, wherein the housing portion comprises a housing and a fixed ring, the housing comprises an annular external wall disposed with a plurality of suction passages running through interior and exterior portions of the annular external wall, and the fixed ring is fixedly connected to a portion of the annular external wall, and the diversion device is fixedly connected to the fixed ring.

7. The flow regulator according to claim 6, wherein the fixed ring is disposed with a conical surface corresponding to the diversion holes of the peripheral wall, and the conical surface surrounds the diversion device so that water flows out of the diversion holes and impacts the conical surface.

8. The flow regulator according to claim 7, wherein the deflecting annular wall has an external revolution surface that expands radially.

9. The flow regulator according to claim 1, wherein the deflecting annular wall has an external revolution surface that comprises a smooth curve.

10. The flow regulator according to claim 1, wherein the deflecting annular wall has an external revolution surface that comprises an arc having a circular center point that faces outwardly.

* * * * *